United States Patent
Romanov

(10) Patent No.: US 10,196,931 B2
(45) Date of Patent: Feb. 5, 2019

(54) TORTUOUS COOLING PASSAGEWAY FOR ENGINE COMPONENT

(71) Applicant: UNITED TECHNOLOGIES CORPORATION, Hartford, CT (US)

(72) Inventor: Dmitriy A. Romanov, Wells, ME (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 350 days.

(21) Appl. No.: 15/023,309

(22) PCT Filed: Sep. 18, 2014

(86) PCT No.: PCT/US2014/056302
§ 371 (c)(1),
(2) Date: Mar. 18, 2016

(87) PCT Pub. No.: WO2015/042262
PCT Pub. Date: Mar. 26, 2015

(65) Prior Publication Data
US 2016/0237852 A1 Aug. 18, 2016

Related U.S. Application Data

(60) Provisional application No. 61/879,205, filed on Sep. 18, 2013.

(51) Int. Cl.
*F01D 11/08* (2006.01)
*F01D 11/24* (2006.01)
*F01D 25/12* (2006.01)

(52) U.S. Cl.
CPC .............. *F01D 25/12* (2013.01); *F01D 11/08* (2013.01); *F01D 11/24* (2013.01); *F05D 2220/32* (2013.01); *F05D 2230/211* (2013.01); *F05D 2240/11* (2013.01); *F05D 2240/12* (2013.01); *F05D 2240/30* (2013.01); *F05D 2250/15* (2013.01); *F05D 2250/25* (2013.01); *F05D 2260/202* (2013.01); *F05D 2260/204* (2013.01); *F05D 2260/209* (2013.01);
(Continued)

(58) Field of Classification Search
CPC .......... F01D 25/08; F01D 25/12; F01D 11/08; F01D 11/14; F01D 11/24; F01D 9/065; F01D 5/18; F01D 5/186; F01D 5/187
See application file for complete search history.

(56) References Cited

U.S. PATENT DOCUMENTS 6,247,896 B1 * 6/2001 Auxier ...................... F01D 5/18
416/97 R
2005/0058534 A1 * 3/2005 Lee ........................ F01D 5/288
415/116
(Continued)

OTHER PUBLICATIONS

The International Preliminary Report on Patentability for PCT Application No. PCT/US2014/056302, dated Mar. 31, 2016.

*Primary Examiner* — Richard A Edgar
*Assistant Examiner* — Elton K Wong
(74) *Attorney, Agent, or Firm* — Carlson, Gaskey & Olds, P.C.

(57) ABSTRACT

One exemplary embodiment of this disclosure relates to a gas turbine engine including a component having a body. The body includes a tortuous cooling passageway, which provides a flow path extending between an inlet in a first surface of the body and an exit in a second surface of the body.

12 Claims, 7 Drawing Sheets

(52) U.S. Cl.
CPC ............... *F05D 2260/2214* (2013.01); *F05D 2260/22141* (2013.01); *Y02T 50/676* (2013.01)

(56) References Cited

U.S. PATENT DOCUMENTS

| | | | |
|---|---|---|---|
| 2006/0140753 A1* | 6/2006 | Romanov | F01D 11/08 415/173.1 |
| 2006/0210390 A1* | 9/2006 | Draper | F23R 3/005 415/115 |
| 2011/0182724 A1* | 7/2011 | Koyabu | F01D 9/04 415/180 |
| 2012/0076645 A1* | 3/2012 | Tibbott | B60G 21/055 415/180 |

* cited by examiner

TORTUOUS COOLING PASSAGEWAY FOR ENGINE COMPONENT

BACKGROUND

Gas turbine engines include blades configured to rotate and extract energy from hot combustion gases that are communicated through the gas turbine engine. An outer casing of the gas turbine engine may support one or more blade outer air seals (BOAS) that provide an outer radial flow path boundary for the hot combustion gases. BOAS may include cooling passageways configured to route a flow of cooling fluid therein. One known BOAS includes parallel cooling passageways extending between circumferential edges thereof.

SUMMARY

One exemplary embodiment of this disclosure relates to a gas turbine engine including a component having a body. The body includes a tortuous cooling passageway, which provides a flow path extending between an inlet in a first surface of the body and an exit in a second surface of the body.

In a further embodiment of any of the above, the flow path includes at least one bend between the inlet and the exit.

In a further embodiment of any of the above, the inlet is provided about an inlet axis.

In a further embodiment of any of the above, the tortuous cooling passageway is a three-dimensional spiral passageway, and the flow path moves progressively further away from the inlet axis as the flow path extends from the inlet to the exit.

In a further embodiment of any of the above, the tortuous cooling passageway is a Z-shaped passageway.

In a further embodiment of any of the above, the Z-shaped passageway includes three sloped portions, and each of the three sloped portions is successively spaced radially further from the first surface.

In a further embodiment of any of the above, the cooling passageway is an M-shaped passageway.

In a further embodiment of any of the above, the M-shaped passageway includes a first inlet and a second inlet converging to a single exit.

In a further embodiment of any of the above, the component includes a plurality of tortuous cooling passageways, and wherein borders of adjacent cooling passageways are aligned relative to one another in at least one direction.

In a further embodiment of any of the above, axial borders and circumferential borders of adjacent cooling passageways are aligned.

In a further embodiment of any of the above, the component is a blade outer air seal (BOAS), and wherein the second surface is positioned adjacent a tip of a rotor blade.

Another exemplary embodiment of this disclosure relates to a blade outer air seal (BOAS). The BOAS includes a body including a tortuous cooling passageway, which provides a flow path extending in each of a radial, axial, and circumferential direction.

In a further embodiment of any of the above, the body includes a first surface and a second surface, the flow path provided between an inlet in the first surface and an exit in a second surface.

In a further embodiment of any of the above, the BOAS includes at least one of a three-dimensional spiral passageway, a Z-shaped passageway, and an M-shaped passageway.

In a further embodiment of any of the above, the BOAS includes a plurality of three-dimensional spiral passageways, a plurality of Z-shaped passageways, and a plurality of M-shaped passageways.

In a further embodiment of any of the above, the plurality of Z-shaped and M-shaped passageways are provided adjacent edges of the BOAS to provide a perimeter, and wherein the plurality of three-dimensional spiral passageways are provided within the perimeter.

In a further embodiment of any of the above, the tortuous cooling passageway includes at least one of trip strips and pedestals therein.

Another exemplary embodiment of this disclosure relates to a casting article. The article includes a first portion providing a negative of an inlet, and a second portion providing a negative of an outlet. The second portion is spaced from the first portion. Further, a third portion provides a negative of a tortuous cooling passageway, with the third portion extending between the first portion and the second portion.

In a further embodiment of any of the above, the third portion includes a plurality of sloped portions, with each of the plurality of sloped portions successively spaced further away from the first portion. The third portion further includes a plurality of legs extending between adjacent ones of the plurality of sloped portions. Each of the plurality of legs are successively spaced further away from the first portion.

In a further embodiment of any of the above, the tortuous cooling passageway is one of a three-dimensional spiral passageway, a Z-shaped passageway, and an M-shaped passageway.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
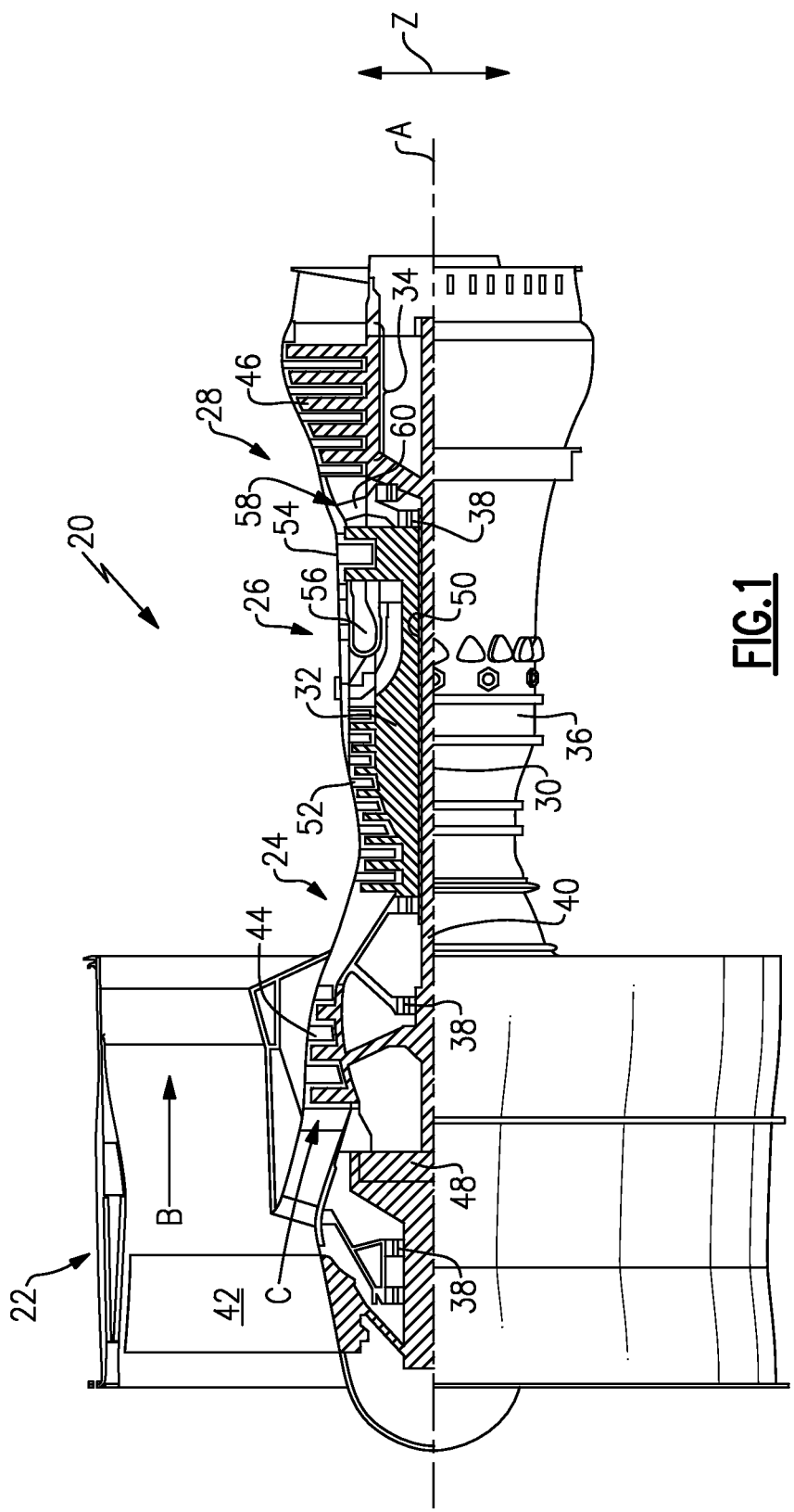
FIG. 1 illustrates a schematic, cross-sectional view of a gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws a core airflow C in along a core flow path where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

Figure 2:
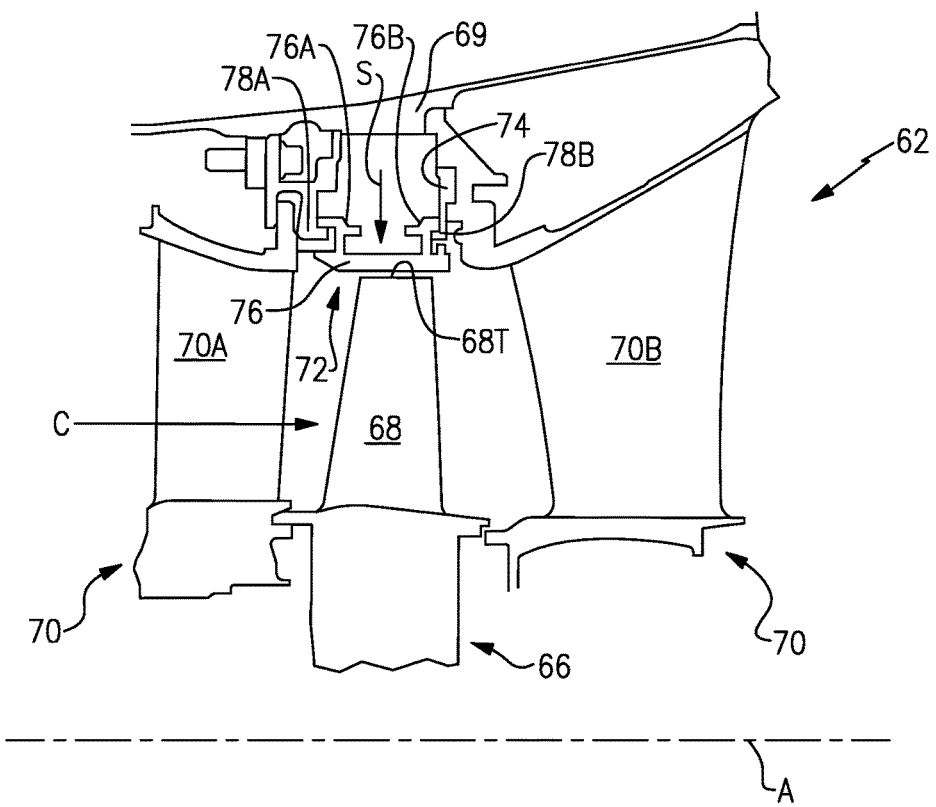
FIG. 2 illustrates a cross-section of a portion of a gas turbine engine.

FIG. 2 illustrates a portion 62 of a gas turbine engine, such as the gas turbine engine 20 of FIG. 1. In this exemplary embodiment, the portion 62 represents the high pressure turbine 54. However, it should be understood that other portions of the gas turbine engine 20 could benefit from the teachings of this disclosure, including but not limited to, the fan section 22, the compressor section 24 and the low pressure turbine 46.

In this exemplary embodiment, a rotor disk 66 (only one shown, although multiple disks could be axially disposed within the portion 62) is mounted for rotation about the engine central longitudinal axis A. The portion 62 includes alternating rows of rotating blades 68 (mounted to the rotor disk 66) and static vane assemblies 70. The vane assemblies 70 each includes a plurality of vanes 70A, 70B that are supported within an outer casing 69 of the engine static structure 36 (FIG. 1).

Each blade 68 of the rotor disk 66 includes a blade tip 68T at a radially outermost portion of the blade 68. The rotor disk 66 is arranged such that the blade tips 68T are located adjacent a blade outer air seal (BOAS) assembly 72. The BOAS assembly 72 may find beneficial use in many industries including aerospace, industrial, electricity generation, naval propulsion, pumps for gas and oil transmission, aircraft propulsion, vehicle engines and stationary power plants.

The BOAS assembly 72 is disposed in an annulus radially between the outer casing 69 and the blade tip 68T. The BOAS assembly 72 generally includes a support structure 74 and a multitude of BOAS segments 76 (only one shown in FIG. 2). For ease of reference, the individual BOAS segments 76 are each individually referred to as a "BOAS segment" or simply a "BOAS."

The BOAS segments 76 may be arranged to form a full ring hoop assembly that circumferentially surrounds the associated blades 68. The support structure 74 is mounted radially inward from the outer casing 69, and includes forward and aft flanges 78A, 78B that receive forward and aft attachment hooks 76A, 76B of the BOAS segments 76. The forward and aft flanges 78A, 78B may be manufactured of a material such as a steel or nickel-based alloy, and may be circumferentially segmented for the receipt of the BOAS segments 76.

A secondary cooling airflow S may be communicated to the BOAS segments 76. The secondary cooling airflow S can be sourced from the high pressure compressor 52 or any other portion of the gas turbine engine 20. In addition to providing a source of cooling air to the BOAS segment 76, the secondary cooling airflow S provides a biasing force that biases the BOAS segment 76 radially inward toward the engine central longitudinal axis A. In one example, the forward and aft flanges 78A, 78B are portions of the support structure 74 that limit radially inward movement of the BOAS segment 76 and that maintain the BOAS segment 76 in position.

Figure 3:
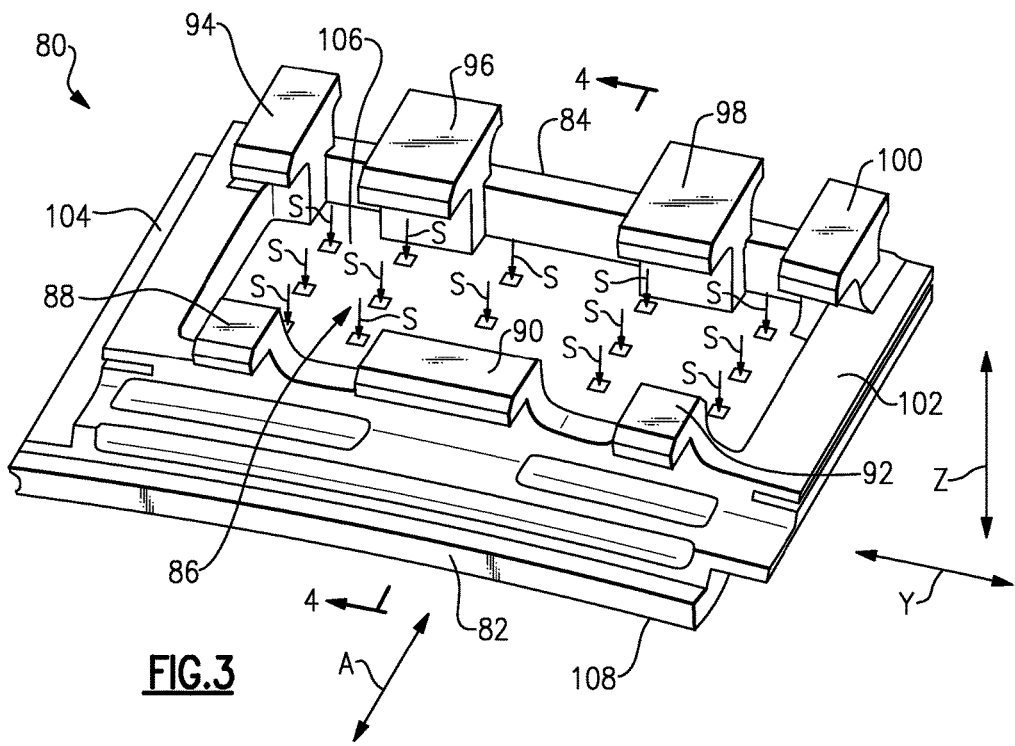
FIG. 3 illustrates an example blade outer air seal (BOAS).

FIG. 3 illustrates a perspective view of an example BOAS segment 80 according to this disclosure. While BOAS segments are discussed herein, it should be understood that this disclosure extends to other engine components, such as blades and vanes, as examples.

The BOAS segment 80 includes a fore edge 82, an aft edge 84, and a main body portion 86 extending axially (e.g., relative to the engine central longitudinal axis A, or the "axial direction A") therebetween. The main body portion 86 includes a plurality of cooling passageways receiving a portion of the secondary cooling airflow S, as will be discussed in detail below. In this example, the BOAS segment 80 includes attachment hooks 88, 90, 92, 94, 96, 98, 100, which extend upwardly from the main body portion 86 adjacent the aft edge 84. The attachment hooks 88, 90, 92, 94, 96, 98, 100 are shown for illustrative purposes only and are not intended to limit this disclosure. The BOAS segment 80 further includes a first circumferential edge 102, and a second circumferential edge 104.

Figure 4A:
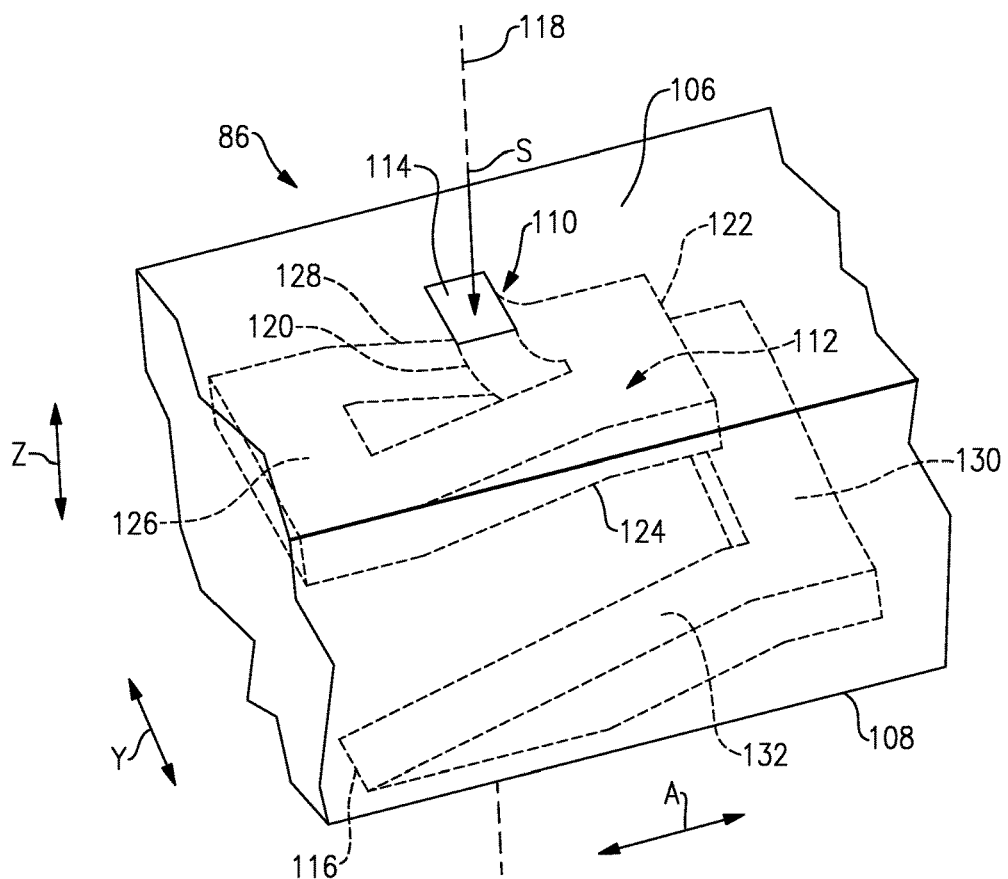
FIG. 4A is a partial, perspective view of the BOAS of FIG. 3, sectioned along line 4-4 in FIG. 3, and in particular illustrates a three-dimensional spiral cooling passageway.
Figure 4B:
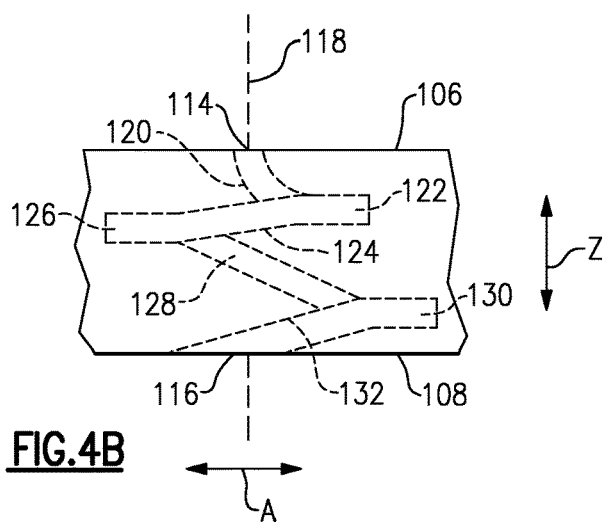
FIG. 4B is a partial view of the BOAS of FIG. 3, sectioned along line 4-4 in FIG. 3.

As illustrated in FIGS. 4A-4B, the main body portion 86 includes a radially outer surface 106, and a radially inner surface 108. The radially outer and inner surfaces 106, 108 are spaced-apart from one another in the radial direction Z, which is normal to the engine central longitudinal axis A.

The main body portion 86 further includes a plurality of tortuous cooling passageways configured to communicate the secondary cooling air flow S between the radially outer and radially inner surfaces 106, 108. As used herein, the term "tortuous" refers to a cooling passageway that provides a flow path having at least one bend or turn between an inlet and an exit thereof. Several example tortuous cooling passageways are discussed herein.

A first example cooling passageway is illustrated at 110. In the example, the cooling passageway 110 provides a three-dimensional spiral flow path 112 between the inlet 114 and the exit 116 in the radially inner surface 108. In particular, the cooling passageway 110 is arranged such that the flow path 112 moves progressively farther away from an inlet axis 118 as the flow path 112 moves from the inlet 114 to the exit 116.

As illustrated, the cooling passageway 110 is in fluid communication with the inlet 114. The inlet 114 is provided about the inlet axis 118, which in this example is arranged parallel to the radial direction Z. Moving radially inward from the inlet 114, the cooling passageway 110 includes a first sloped portion 120 turning the flow path 112 from a generally radial direction Z to a generally axial direction A, and configured to direct a secondary cooling flow S toward a first leg 122 of the flow path 112.

The first leg 122 extends in a circumferential direction Y, which is substantially normal to the axial direction A. The first leg 122 is in communication with a second sloped portion 124, which runs substantially parallel to the first sloped portion 120. The second sloped portion 124 leads to a second leg 126, which extends in the circumferential direction Y and, in turn, leads to a third sloped portion 128. Finally, the third sloped portion 128 extends in the axial direction A toward a third leg 130, which extends circumferentially to a fourth sloped portion 132. The fourth sloped portion 132 is in fluid communication with the exit 116.

Each sloped portion 120, 124, 128, 132 is inclined (or, angled) to extend non-parallel to the radially outer surface 106 to direct the secondary cooling flow S radially toward the exit 116. That is, in the example of FIGS. 4A-4B, as the secondary cooling flow S travels along each sloped portion 120, 124, 128, 132, the secondary cooling flow S travels both axially along the length of the particular sloped portion and radially toward the exit 116. Accordingly, each successive sloped portion 120, 124, 128, 132 is radially spaced (e.g., in the direction Z) further from the radially outer surface 106 than the prior sloped portion.

Further, in this example, each successive leg 122, 126, 130 is radially spaced further from the radially outer surface 106 than the prior leg. It should be understood that the legs 122, 126, 130 may also be sloped (e.g., inclined to extend non-parallel to the radially outer surface 106) alternatively, or in addition to, the sloping of the sloped portions 120, 124, 128, 132.

It should further be understood that while four sloped portions 120, 124, 128, 132 and three legs 122, 126, 130 are illustrated, the cooling passageway 110 could include any number of sloped portions and legs.

During operation, a portion of a secondary cooling flow S is routed into the cooling passageway 110, and flows along the flow path 112 to cool the BOAS segment 80. The secondary cooling flow S exits the cooling passageway 110 out the exit 116, and generates a film providing additional sealing between the BOAS segment 80 the adjacent blade tips 68T. The exit 116 may be shaped to provide a desired film.

Figure 5:
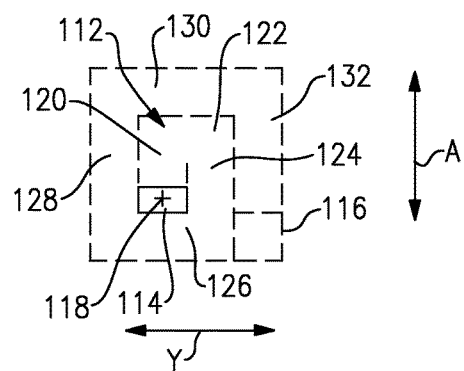
FIG. 5 represents the three-dimensional spiral cooling passageway of FIG. 4.

FIG. 5 schematically represents the cooling passageway 110 viewed from a location radially outboard of the radially outer surface 106. As illustrated between FIGS. 4 and 5, the flow path 112 directs the secondary cooling flow S in three directions, radially (in direction Z) between the outer surface 106, and the inner surface 108, axially, via the sloped portions 120, 124, 128, 132, and circumferentially, by way of the legs 122, 126, 130. This provides a relatively large effective cooling area in a relatively small three-dimensional space.

Figure 6:
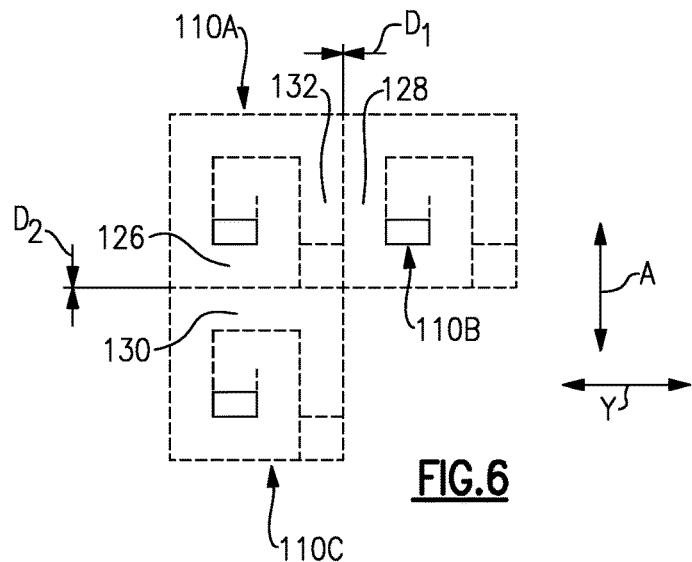
FIG. 6 illustrates an arrangement of adjacent cooling passageways.

The main body portion 86 of the BOAS may include a plurality of the cooling passageways 110 positioned adjacent one another. For instance, as illustrated in FIG. 6, circumferential borders of adjacent passageways may be circumferentially aligned. That is, with reference to FIG. 6, the circumferential border of the fourth sloped portion 132 of the cooling passageway 110A is spaced a circumferential distance $D_1$ from a circumferential border of the third sloped portion 128 of the adjacent cooling passageway 110B. In one example, the distance $D_1$ is zero, in which case the circumferential borders of the cooling passageways 110A, 110B are circumferentially aligned. This relatively close packing between adjacent cooling passageways 110A, 110B is possible due to the third sloped portion 132 being radially spaced from the second sloped portion 128, as described above.

Likewise, axial borders of adjacent cooling passageways may be axially aligned. For instance, the axial border of the second leg 126 of the cooling passageway 110A is spaced a circumferential distance $D_2$ from an axial border of the third leg 130 of an adjacent cooling passageway 110C. The distance $D_2$ is zero in one example, in which case the axial borders of the cooling passageways 110A, 110C are axially aligned. Again, this close packing is possible because the legs 126 and 130 are radially spaced apart from one another.

Figure 7:
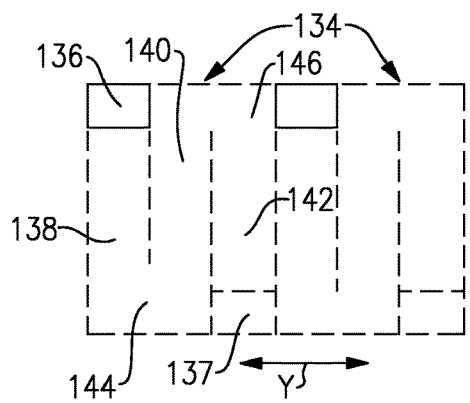
FIG. 7 represents a Z-shaped cooling passageway.

While a three-dimensional spiral passageway is illustrated in FIGS. 5-6, this disclosure extends to other types of cooling passageways. For instance, FIG. 7 illustrates Z-shaped passageways 134. The Z-shaped cooling passageways 134 include an inlet 136 and a plurality of sloped portions 138, 140, and 142. The sloped portions, like the above-discussed sloped portions, are inclined to extend non-parallel to the radially outer surface 106. The sloped portions 138, 140, 142 direct a secondary cooling airflow S in both an axial direction A and a radial direction A toward an exit 137.

The Z-shaped passageways further include a first leg 144 extending circumferentially between the first and second sloped portions 138, 140, and a second leg 146 extending circumferentially between the second sloped portion 140 and the third sloped portion 142. As mentioned above relative to the embodiment of FIGS. 4-5, the first and second legs 144, 146 may also be sloped.

Figure 8:
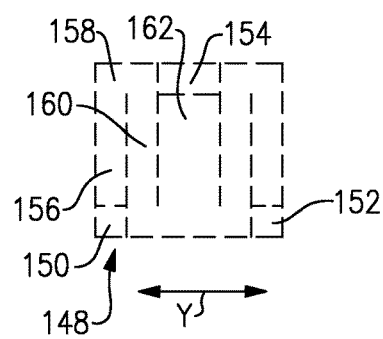
FIG. 8 represents an M-shaped cooling passageway.

FIG. 8 illustrates another cooling passageway 148. In this example, the cooling passageway 148 is an M-shaped cooling passageway. The cooling passageway 148 includes a first inlet 150, a second inlet 152, and a common exit 154. As a flow of fluid enters the first inlet 150, it is directed along a first sloped portion 156, turned circumferentially at a first leg 158, and directed along a second sloped portion 160. Another, separate flow similarly travels from the first inlet 152, where it converges with flow from the first inlet 150 at a third, common sloped portion 162, which finally directs the converging flows from the first and second inlets 150, 152 to a common exit 154 in the radially inner surface 108.

Figure 9:
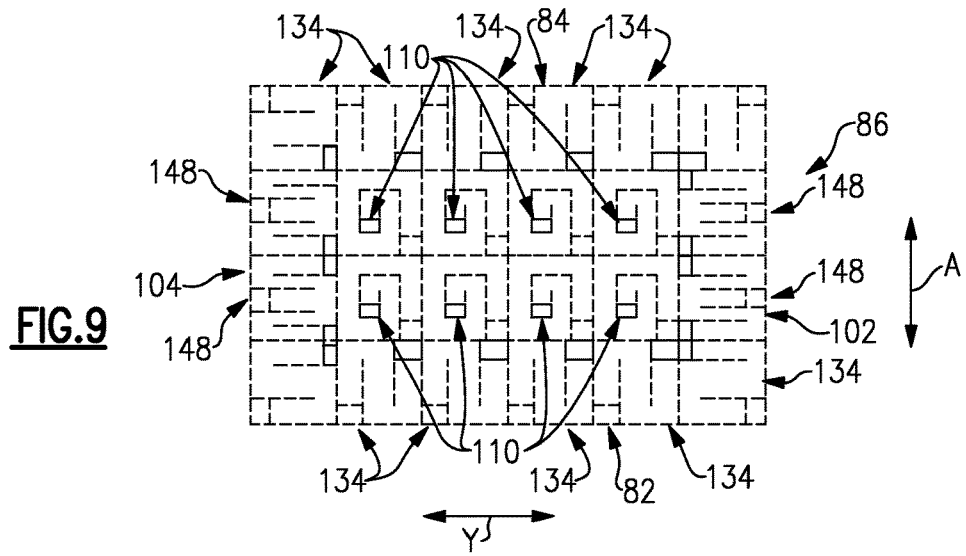
FIG. 9 represents an example cooling arrangement.

It should be understood that the main body portion 86 may include one or more different cooling passageways. For instance, one example layout is illustrated in FIG. 9. In this example, the main body portion 86 includes a plurality of Z-shaped passageways 134 along both the fore and aft edges 82, 84 thereof. The circumferential edges 102, 104 in this example include M-shaped cooling passageways 148. The Z-shaped and M-shaped passageways 134, 148 define a perimeter adjacent the outer edges of the main body portion 86.

A plurality of three-dimensional spiral passageways 110 are provided within the perimeter of Z-shaped and M-shaped passageways 134, 148. The illustrated arrangement is particularly beneficial because it provides the inlets to each of the passageways 110, 134, 148 at a point that is spaced inward from one of the edges 82, 84, 102, 104. This inward spacing of the inlets allows for a clearance between the inlets and the adjacent engine and BOAS structures (e.g., such as the attachment hooks 88, 90, 92, 94, 96, 98, 100 in FIG. 3) which may interfere with the secondary cooling flow S.

Figure 10A:
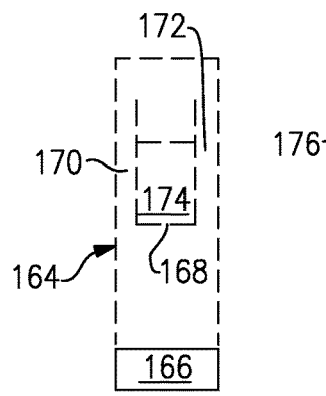
FIG. 10A represents a divergent cooling passageway.

Additional tortuous cooling passageways are contemplated within the scope of this disclosure. FIG. 10A illustrates a divergent cooling passageway 164 which has an inlet 166 and a divider wall 168 downstream therefrom which separates a flow of fluid into two parallel flows moving along parallel sloped passageways 170, 172. The passageways 170, 172 then merge and exit out the exit 174.

Figure 10B:
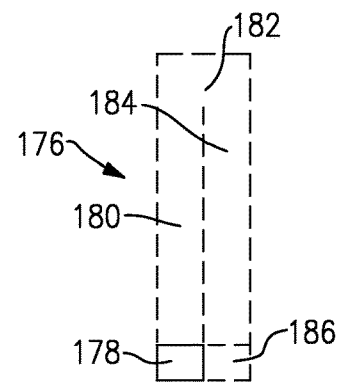
FIG. 10B represents a U-shaped cooling passageway.

FIG. 10B illustrates a U-shaped cooling passageway 176. The cooling passageway 176 includes an inlet 178, a first sloped portion 180, a first leg 182 and a second sloped portion 184 which leads to an exit 186.

Figure 10C:
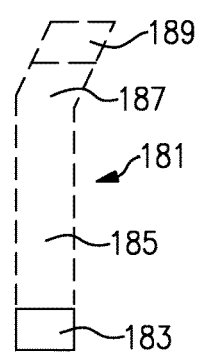
FIG. 10C represents an angled cooling passageway.

Still another example is illustrated in FIG. 10C, which shows an angled cooling passageway 181. The cooling passageway 181 includes an inlet 183, a sloped portion 185, and an angled portion 187 leading to an exit 189. The angled portion 187 extends in a direction inclined relative to the radially outer surface 106, and relative to the direction the sloped portion 185 extends. Again, while several example cooling passageways are illustrated, it should be understood that additional passageways come within the scope of this disclosure.

Figure 11A:
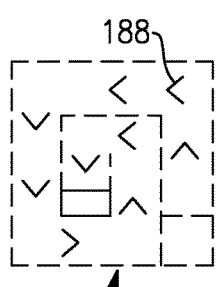
FIG. 11A illustrates a cooling passageway with trip strips.
Figure 11B:
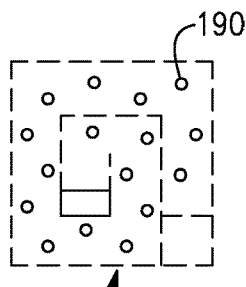
FIG. 11B illustrates a cooling passageway with pedestals.

Further, it should be understood that features for enhanced cooling, such as trip strips 188 (FIG. 11A) or pedestals 190 (FIG. 11B) can be included in the cooling passageways for increased cooling, depending on a heat load, for example.

The cooling passageways described herein can be formed using any known technique. One known technique includes additive manufacturing. Another known technique includes investment casting. In the example where the passageways are formed using investment casting, a wax pattern of the BOAS segment 80 is formed. In the example, a casting article (e.g., a core insert) is provided into a die, and a wax pattern of the BOAS segment 80 is formed.

Figure 12:
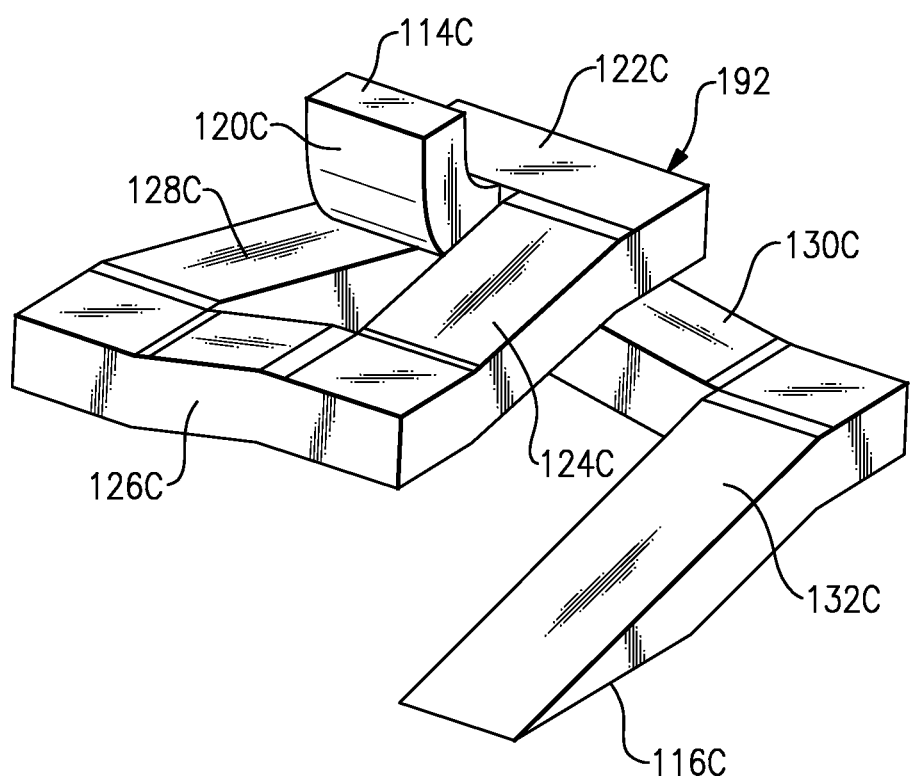
FIG. 12 illustrates a casting article used for forming the three-dimensional spiral cooling passageway in one example.

An example casting article 192 is illustrated in FIG. 12. The casting article 192 is a dimensional negative of the cooling passageway 110. FIG. 12 is labeled with numbers corresponding to the respective portions of the cooling passageway 110, appended with a "C." For the sake of brevity, the portions of the cooling passageway 110 described above will not be repeated herein relative to the casting article 192.

The casting article 192 in this example is a refractory metal core (RMC) insert. In one example, the RMC core may be additively manufactured. In other examples, the article may be a ceramic insert. In either case, the casting article is provided in the wax pattern and remains part of the wax pattern until the component is cast. As is known in the art, the casting is completed, and the main body portion 86 is provided with the intended passageway.

While the terms "axial," "circumferential," "radial," etc., are used throughout this disclosure to describe the arrangement of the various cooling passageways, it should be understood that these terms are used only for purposes of illustration, and should not otherwise be considered limiting.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
    a component having a body including a tortuous cooling passageway, the tortuous cooling passageway providing a flow path extending between an inlet in a first surface of the body and an exit in a second surface of the body, wherein the inlet is provided about an inlet axis, wherein the tortuous cooling passageway includes a plurality of sloped portions inclined relative to the first surface of the body, wherein, as the tortuous cooling passageway extends from the inlet to the exit, the tortuous cooling passageway moves progressively further away from the inlet axis in a direction normal to the inlet axis, and wherein the tortuous cooling passageway is a three-dimensional spiral passageway.

2. The gas turbine engine as recited in claim 1, wherein the flow path includes at least one bend between the inlet and the exit.

3. The gas turbine engine as recited in claim 1, wherein the component includes a plurality of tortuous cooling passageways, and wherein borders of adjacent cooling passageways are aligned relative to one another in at least one direction.

4. The gas turbine engine as recited in claim 3, wherein axial borders and circumferential borders of adjacent cooling passageways are aligned.

5. The gas turbine engine as recited in claim 1, wherein the component is a blade outer air seal (BOAS), and wherein the second surface is positioned adjacent a tip of a rotor blade.

6. A gas turbine engine, comprising:
    a component having a body including a tortuous cooling passageway, the tortuous cooling passageway providing a flow path extending between an inlet in a first surface of the body and an exit in a second surface of the body;
    wherein the inlet is provided about an inlet axis;
    wherein the tortuous cooling passageway is a Z-shaped passageway; and
    wherein the Z-shaped passageway includes three sloped portions, and wherein each of the three sloped portions is successively spaced, in a direction normal to the first surface, further from the first surface.

7. A gas turbine engine, comprising:
    a component having a body including a tortuous cooling passageway, the tortuous cooling passageway providing a flow path extending between an inlet in a first surface of the body and an exit in a second surface of the body, wherein the inlet is provided about an inlet axis, wherein the tortuous cooling passageway includes a plurality of sloped portions inclined relative to the first surface of the body, wherein, as the tortuous cooling passageway extends from the inlet to the exit, the tortuous cooling passageway moves progressively further away from the inlet axis in a direction normal to the inlet axis, and wherein the tortuous cooling passageway is an M-shaped passageway.

8. The gas turbine engine as recited in claim 7, wherein the M-shaped passageway includes a first inlet and a second inlet converging to a single exit.

9. A blade outer air seal (BOAS), comprising:
    a body including a tortuous cooling passageway, the tortuous cooling passageway extending from an inlet in a first surface of the body to an exit in a second surface of the body, the inlet disposed about an inlet axis, the tortuous cooling passageway providing a flow path extending in each of a radial, axial, and circumferential direction relative to the inlet axis, the tortuous passageway further including a plurality of sloped portions inclined relative to the first surface of the body, wherein, as the tortuous cooling passageway extends from the inlet to the exit, the tortuous cooling passageway moves progressively further away from the inlet axis in a direction normal to the inlet axis, and wherein the tortuous cooling passageway is one of (1) a three-dimensional spiral passageway, (2) a Z-shaped passageway including three sloped portions with each of the three sloped portions successively spaced, in a direction normal to the first surface, further from the first surface, and (3) an M-shaped passageway.

10. The BOAS as recited in claim 9, wherein the BOAS includes a plurality of three-dimensional spiral passageways, a plurality of Z-shaped passageways, and a plurality of M-shaped passageways.

11. The BOAS as recited in claim 9, wherein the tortuous cooling passageway includes at least one of trip strips and pedestals therein.

12. A blade outer air seal (BOAS), comprising:
    a body including a tortuous cooling passageway, the tortuous cooling passageway providing a flow path extending in each of a radial, axial, and circumferential direction relative to an arrangement of the BOAS in a gas turbine engine;
    wherein the body includes a first surface and a second surface, the flow path provided between an inlet in the first surface and an exit in a second surface;
    wherein the BOAS includes a plurality of three-dimensional spiral passageways, a plurality of Z-shaped passageways, and a plurality of M-shaped passageways; and
    wherein the plurality of Z-shaped and M-shaped passageways are provided adjacent edges of the BOAS to provide a perimeter, and wherein the plurality of three-dimensional spiral passageways are provided within the perimeter.

* * * * *